(12) United States Patent
Crepaz

(10) Patent No.: US 7,361,008 B2
(45) Date of Patent: Apr. 22, 2008

(54) THERMOFORMING SYSTEM

(75) Inventor: Johannes Crepaz, Wals-Slezenheim (AT)

(73) Assignee: Kiefel AG, Freilassing (DE)

( * ) Notice: Subject to any disclaimer, the term of this patent is extended or adjusted under 35 U.S.C. 154(b) by 93 days.

(21) Appl. No.: 10/470,640

(22) Filed: Sep. 17, 2004

(65) Prior Publication Data

US 2005/0186303 A1    Aug. 25, 2005

(30) Foreign Application Priority Data

Sep. 30, 2003    (DE)    ................. 103 45 534

(51) Int. Cl.
*B28B 11/00* (2006.01)
(52) U.S. Cl. .................. 425/397; 425/394; 425/395; 425/403
(58) Field of Classification Search ................ 425/185, 425/390, 384, 394, 395, 397, 403
See application file for complete search history.

(56) References Cited

U.S. PATENT DOCUMENTS 4,428,723 A * 1/1984 Thiel et al. ............... 425/324.1
4,883,419 A * 11/1989 Queirel .................... 425/326.1
4,954,066 A * 9/1990 Leary et al. ................ 425/388
5,863,568 A * 1/1999 Tomita et al. .............. 425/185

FOREIGN PATENT DOCUMENTS

| DE | 19536867 C1 | * 11/1996 |
| DE | 100 22 269 | 11/2001 |
| EP | 0 767 047 | 4/1997 |
| EP | 1 462 177 | 9/2004 |

* cited by examiner

*Primary Examiner*—Yogendra N Gupta
*Assistant Examiner*—Maria Veronica Ewald
(74) *Attorney, Agent, or Firm*—Michael J. Striker

(57) ABSTRACT

In the case of a thermoforming system, it is provided, for the purpose of changing over the moulds (11, 12) in a station (1) of this system, that one (4) of the two transporting devices (3, 4), for transporting the sheet (7) from one station to the other, can be displaced in the direction of the other transporting device (3), transversely to the conveying direction, in order to create space on one side of the lifting tables (9, 10) so that it is possible for the mould block (11, 12) to be moved out of the station onto a mould-changing arm (13) and, from there, onto a mould-changing carriage (15).

6 Claims, 3 Drawing Sheets

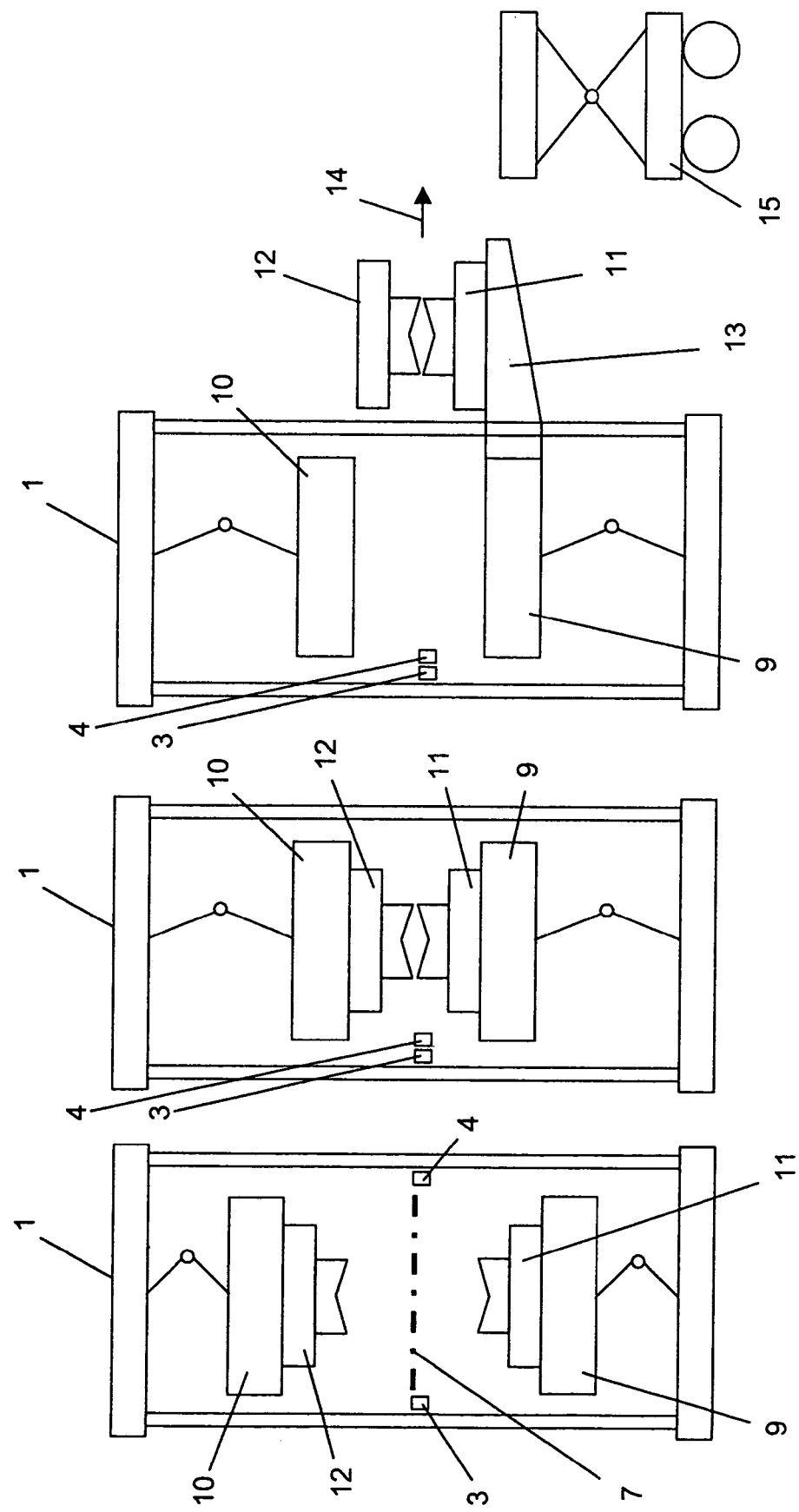

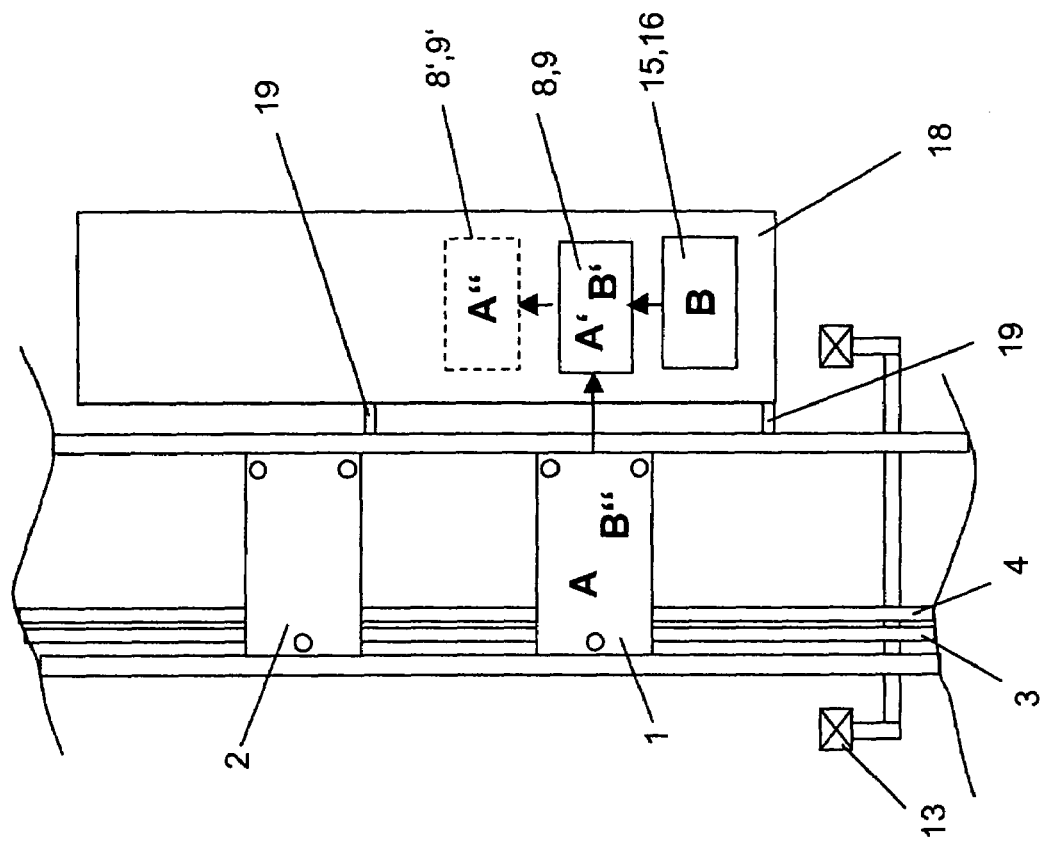
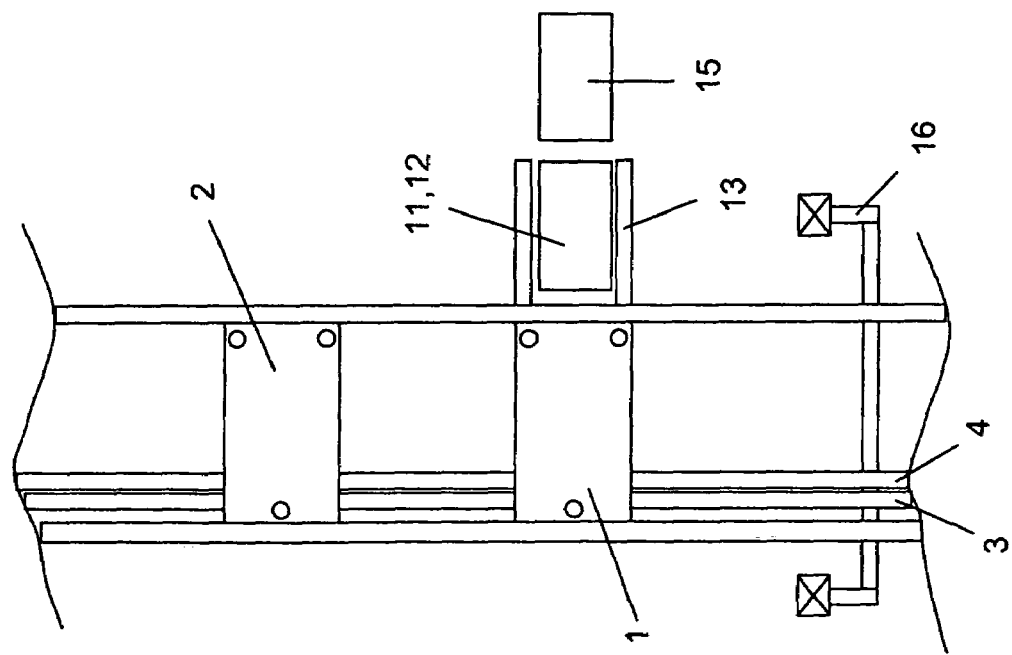

THERMOFORMING SYSTEM

The invention relates to a thermoforming system having at least one station for producing or processing moulded parts which can be produced from a sheet, in the case of which the sheet is gripped along the two longitudinal borders by a respective conveying device and can be conveyed through the at least one station.

Thermoforming systems of this type are known in general.

In the case of mould changeover in a pre-forming station, a forming station, a trimming station or punching-out station and in a stacking station, it is possible for the top and bottom parts of a mould or of some other processing arrangement to be retrieved separately from one another from the respective station and replaced for another appropriate part, or the associated parts of the mould or of the processing arrangement are exchanged in a centred form as a block.

The first exchange method has the disadvantage that the associated parts, for example the top and bottom moulds, have to be realigned in relation to one another, which is time-consuming. The second, block-form exchange method does not have this disadvantage, but requires forming stations or punching-out stations or stacking stations which have to be able to execute a large displacement in order for it to be possible for the entire block, comprising top and bottom moulds, or other arrangements, provided on the top or bottom table or on a top or bottom supporting device, to be removed laterally from beneath or above the respective conveying device. Large displacements require correspondingly large systems which involve correspondingly high outlay.

The object of the invention is to provide a thermoforming system in the case of which mould changeover or changeover of other processing arrangements, can be carried out irrespective of the displacement which can be executed by the mould-tables or by the corresponding mounts for the arrangements.

Taking as departure point a thermoforming system of the type specified in the preamble of claim 1, this object is achieved according to the invention in that at least one of the conveying devices can be transferred, transversely to the conveying direction, from its operating position into a second position, in which it is possible to exchange a mould or arrangement serving for producing or processing the moulded parts, irrespective of the travel or displacement which can be executed by the table supporting the mould or the arrangement, or by some other supporting arrangement.

Since the transporting arrangements can be moved out of that region which is required for changing over the mould or the processing arrangement, it is also possible to carry out mould changeover in systems which do not provide for a large table displacement or other travel distance for the corresponding retaining arrangements in order for it to be possible for the mould or the processing arrangement to be moved laterally out of the operating position from beneath or above the transporting device. The individual mould parts, that is to say the top mould and bottom mould or other two-part arrangements, can thus remain in their aligned and/or centred position, as a result of which there is no need for any subsequent centring when these moulds and arrangements are reused.

The main advantage, however, is that the individual stations—the forming station, punching station, etc.—do not have to be designed in order to allow the supports or tables which retain the individual mould parts or arrangement parts to be able to move out to any great extent, which results in stations with a relatively low level of technical complexity and thus relatively low financial outlay.

Following changeover, it is possible for the mould parts or arrangement parts, which remain in their centred position in relation to one another, to remain connected, for reuse, to a temperature-control station, with the result that subsequent use can take place, with a repeated changeover, without any time delay in the operational cycle since it is no longer necessary to wait for the moulds to be reheated or heated up.

In an advantageous configuration of the invention, the conveying device used may be a needle chain, roller chain or belt drive or clip chain.

A further advantageous configuration of the invention consists in that one conveying device can be displaced parallel alongside the second conveying device. This results in a straightforward design solution, in particular when, in a further configuration of the invention, a width-adjusting device for the parallel conveying devices is provided for the purpose of displacing the conveying device. Such a width-adjusting device is necessary in order to make it possible for the individual conveying devices to be adjusted to the respective width of the sheet which is to be transported and processed.

The invention is explained in more detail hereinbelow with reference to the exemplary embodiments illustrated in the drawing, in which:

FIG. 2 shows a schematic illustration of a forming station of a thermoforming system in an operating position;

FIG. 3 shows a forming station in a mould-changing position;

FIG. 4 shows the forming station according to FIGS. 2 and 3 with the mould pushed out;

FIG. 5 shows a plan view of the forming station according to FIG. 4; and FIG. 6 shows a plan view of a forming station of the second exemplary embodiment.

Figure 1:
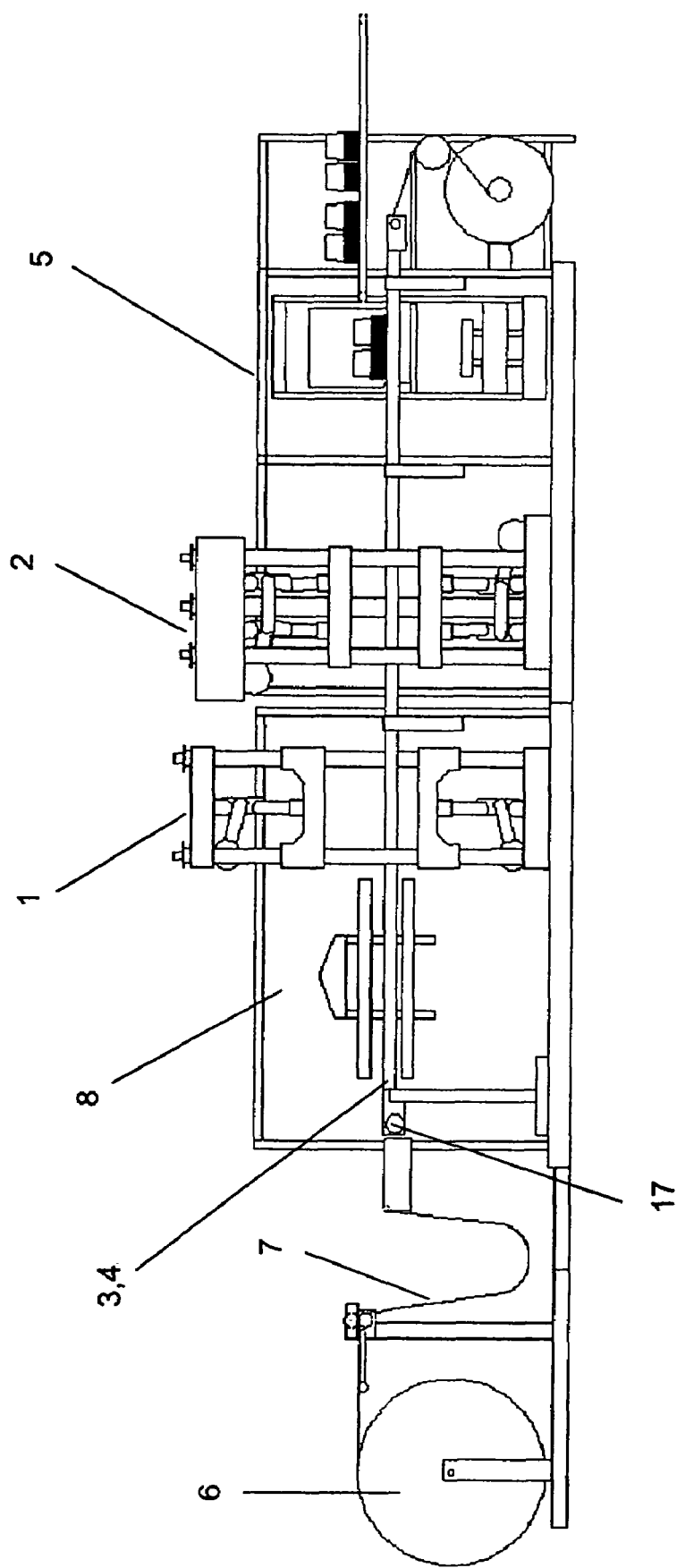
FIG. 1 shows a schematic illustration of a thermoforming system.

The thermoforming system which is illustrated schematically in FIG. 1 comprises a forming station 1, a punching station 2, parallel chain rails 3, 4 serving as a conveying device, and a stacking station 5. By means of the chain rails 3, 4, a sheet 7 which is rolled up on a reel 6 is transported through the individual stations, namely the forming station 1, the punching station 2 and the stacking station 5. The sheet is merely present in lattice form following the punching station 2, since the moulded parts have been punched out in the punching station 2. The punched-out parts are then stacked with one another in the stacking station from beneath and, once a certain stacking height has been reached, are conveyed away. 8 designates a heating station which is located upstream of the forming station, in order to heat up the sheet.

FIGS. 2 to 4 show a cross section through the forming station I in different operating positions. In this forming station, a bottom lifting table is designated 9 and a top table is designated 10. Each of these tables supports a mould, to be precise the bottom table 9 supports a mould 11 and the top table supports a mould 12. In FIG. 2, the two tables 9 and 10 have been moved apart from one another and the two chain rails 3 and 4 hold a heated-up sheet 7 ready for a forming operation, in the case of which the two moulds 11 and 12 are moved together in order to bring about the desired deformation of the sheet to form a moulded part.

In FIG. 3, the two tables 9 and 10, and thus also the moulds 11 and 12, have been moved together into a position in which they are centred in relation to one another, one chain rail 4 having been displaced alongside the chain rail 3 in order to free the space on the right-hand side, as seen in FIG. 3, between the two tables 9 and 10.

FIG. 4 shows the forming station in a position in which the block comprising the bottom mould 11 and top mould 12 has already been released from the two tables 9 and 10 and moved out onto a mould-changing arm 13. From there, the block comprising the two moulds passes, in accordance with the arrow direction 14, onto a mould-changing carriage 15, which serves for transporting the moulds 11 and 12 away. Once the moulds 11 and 12 have been transported away, other moulds may be fastened on the tables 9 and 10, in order for it to be possible to produce other moulded parts.

FIG. 5 shows a plan view of the set-up according to FIG. 4. The position of the block, comprising the moulds 11 and 12, on the mould-changing arm 13 can be seen from this figure. FIG. 5 also shows a width-adjusting device 16, which predominantly serves for adjusting the spacing between the chain rails 3 and 4 used as a transporting device for the sheet, this width-adjusting device also being used, at the same time, for displacing the chain rail 4 into the position illustrated in FIGS. 3 to 5. In order to drive the conveying devices 3, 4 and/or the conveying chains in the longitudinal direction, use is made of a drive arrangement 17 which is indicated schematically in FIG. 1.

FIG. 6 shows a plan view of a forming station corresponding to the illustration in FIG. 5, but for a modified mould-changing operation.

As can be seen from this figure, the mould block designated A, and comprising the top mould and the bottom mould, is pulled or pushed into the position designated A' on an automatically operating mould-changing device 18 and, from there, is moved into the position A". A second mould block, which is designated B, is then moved into the position B', in order for it to be possible for this to be pulled or pushed from there into the forming station. In this position, the mould block is designated B". The changeover of the power connections which is necessary for changing over the moulds is not illustrated. The moulds are kept at their operating temperature in the individual positions by pre-heating, with the result that, for example, the mould block B is moved into the forming station in an already pre-heated state. 19 designates positioning aids for the purpose of retaining the mould-changing device 18 in the correct position in relation to the forming station 1. The mould-changing device 18 may be designed as a shunting station, as a carousel or as a paternoster.

The invention claimed is:

1. Thermoforming system having at least one station (1, 2, 5) for producing or processing moulded parts which can be produced from a sheet (7), in the case of which the sheet (7) is gripped along two longitudinal borders by a first and a second conveying device (3, 4) and can be conveyed through said at least one station in a conveying direction, wherein the first conveying device (4) can be transferred, transversely to the conveying direction, from a first operating position into a second position, in which it is possible to exchange a mould (11, 12) or arrangement serving for producing or processing the moulded parts irrespective of a travel or displacement which can be executed by a table or tables (9, 10) or by some other supporting arrangement supporting the mould (11, 12) or said producing or processing arrangement, wherein the second position of the first conveying device (4) is alongside the second conveying device (3), on one side between said tables (9, 10) or said other supporting arrangement, thereby freeing space on the other side between said tables (9, 10) or said other supporting arrangement.

2. Thermoforming system according to claim 1, wherein the conveying devices (3, 4) used are needle chains, roller chains, belt drives, or clip chains.

3. Thermoforming system according to claim 1, wherein the first one conveying device (4) can be displaced parallel alongside the second conveying device (3).

4. Thermoforming system according to claim 1, wherein a width-adjusting device (16) for the conveying devices (3, 4) that are parallel to one another is provided for the purpose of displacing the second conveying device (4).

5. Thermoforming system according to claim 1, wherein each of said first and said second conveying devices (3, 4) is configured so that it conveys the sheet (7) in the conveying direction which is a single, one-way conveying direction.

6. Thermoplastic system according to claim 1, wherein said first and second conveying devices (3, 4) are configured to grip along two longitudinal borders the sheet (7), which is provided rolled up on a reel (6).

* * * * *